United States Patent
Cawthorne et al.

(10) Patent No.: US 7,999,668 B2
(45) Date of Patent: Aug. 16, 2011

(54) SERIES INTERLOCK SYSTEM WITH INTEGRATED ABILITY TO IDENTIFY BREACHED LOCATIONS

(75) Inventors: William R. Cawthorne, Milford, MI (US); James E. Tarchinski, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 449 days.

(21) Appl. No.: 12/272,339

(22) Filed: Nov. 17, 2008

(65) Prior Publication Data

US 2010/0123573 A1    May 20, 2010

(51) Int. Cl.
*H04Q 1/30* (2006.01)

(52) U.S. Cl. ........ 340/532; 340/509; 340/511; 340/515; 340/517; 340/529; 340/538.14; 340/539.13; 307/137; 307/139; 307/141.8; 307/142

(58) Field of Classification Search .............. 340/532, 340/509, 511, 515, 517, 529, 538.14, 539.13; 307/137, 139, 141.8, 142
See application file for complete search history.

(56) References Cited

U.S. PATENT DOCUMENTS

| | | | |
|---|---|---|---|
| 3,699,300 A * | 10/1972 | Buerki | 219/722 |
| 6,487,456 B1 | 11/2002 | Masano et al. | |
| 2008/0061634 A1* | 3/2008 | Iwata et al. | 307/141 |

* cited by examiner

*Primary Examiner* — Tai T Nguyen
(74) *Attorney, Agent, or Firm* — Ingrassia Fisher & Lorenz, P.C.

(57) ABSTRACT

A system is provided for implementing a series interlock loop. An example of the interlock system includes a series interlock loop, a data table, and a control module. The series interlock loop has an overall electrical characteristic. The series interlock loop includes first and second safety interlocks electrically coupled in series. Each interlock includes a switch coupled in parallel with an impedance value. The data table is configured to store values corresponding to the impedance values. The control module is communicatively coupled to the data table and configured to receive an indication of the overall electrical characteristic and to compare the overall electrical characteristic to the values in the data table to thereby identify an open one of the first and second safety interlocks.

20 Claims, 4 Drawing Sheets

SERIES INTERLOCK SYSTEM WITH INTEGRATED ABILITY TO IDENTIFY BREACHED LOCATIONS

TECHNICAL FIELD

The following description generally relates to safety interlock systems used in motor vehicles.

BACKGROUND

In many motor vehicles, an interlock system is provided to restrict access to certain electrical features. Many vehicles, for example, have high voltage electrical system to power electric motors or other systems.

Interlock systems generally prevent access to high voltage or other systems by shutting down the systems when potentially unsafe conditions are detected. A conventional interlock system generally detects a potentially unsafe condition with a switch connected to an access cover or panel at an access point. The access cover prevents access to a high voltage or the like. When the cover is open, the switch opens to disable the high voltage or other electrical condition. When the access cover is in place, the switch remains closed.

Many conventional interlock systems have more than one access point with more than one interlock. The switches in each of the interlocks are typically connected in series in an interlock loop that is connected to a controller. When all of the interlocks are closed, current can flow through the series interlock loop. With all of the interlocks closed, the controller detects a safe condition and enables the system. If any one or more of the interlocks are open, then current generally cannot flow through the series interlock loop. With an open condition in the interlock loop, the controller disables or otherwise changes the state of the system to prevent access to high voltage or other conditions.

In conducting a repair or analysis of a conventional system that has multiple access points with multiple interlocks, the controller typically only indicates that there is a breach in the series interlock loop, without indicating the location of the breach. That is, the controller in a conventional series interlock system only detects one state corresponding to all interlocks being closed. Service personnel often spend considerable time and effort to analyze and then correct the breach in the interlock system because they can only guess which of the interlocks are breached, and how many interlocks are breached. With four interlocks, for example, in a conventional series interlock loop there are $2^4$ possibilities or 16 possible states of the conventional series interlock loop leading to a number of possible conditions to be manually diagnosed by the technician. Further, in conventional series interlock systems, other conditions such as an open connector or a broken wire in the series interlock loop may also appear as a breached interlock location, thereby further complicating diagnosis of an "open" interlock system.

One conventional solution to the challenge of diagnosing interlock breach problems is to run a separate interlock loop to each interlock, thereby placing the interlocks in parallel rather than in series. This solution has drawbacks in added costs, space, weight, and time for installation, as many additional wires are generally needed to operate the interlocks.

Accordingly, it is desirable to provide a series interlock system with the ability to identify individual breached locations. Furthermore, other desirable features and characteristics will become apparent from the subsequent detailed description and the appended claims, taken in conjunction with the accompanying drawings and the foregoing technical field and background.

SUMMARY

According to various exemplary embodiments, an interlock system includes a series interlock loop having an overall electrical characteristic. The series interlock loop including a first safety interlock with a first switch coupled in parallel with a first impedance value. A second safety interlock is electrically coupled in series with the first safety interlock. The second safety interlock includes a second switch coupled in parallel with a second impedance value. A control module is communicatively coupled to a data table with values, and is configured to receive an indication of the overall electrical characteristic. The control module compares the overall electrical characteristic to the values in the data table to identify open safety interlocks.

Another example of a series interlock system includes a series interlock loop with a first safety interlock at a first location in the series interlock loop. The first safety interlock including a first open position and a first open interlock impedance value corresponding to the first open position. The series interlock loop also includes a second safety interlock at a second location in the series interlock loop electrically coupled in series with the first safety interlock. The second safety interlock includes a second open position and a second open interlock impedance value corresponding to the second open position. A sensor is configured to measure an overall electrical characteristic of the series interlock loop. The overall electrical characteristic has a first overall impedance value corresponding to the first open interlock impedance value when only the first safety interlock is breached. The overall characteristic has a second overall impedance value corresponding to the second open interlock impedance value when only the second safety interlock is breached. The first overall impedance value is different from the second overall impedance value.

Another example embodiment includes a method of implementing a safety interlock system. The safety interlock system includes a series interlock loop with multiple interlocks each comprising a unique impedance value. The safety interlock system also includes a data table storing values corresponding to unique states of the series interlock loop, and an overall electrical characteristic of the series interlock loop. The method includes obtaining a numerical value representing the overall electrical characteristic of the series interlock loop. The method also includes identifying a breached interlock by comparing the numerical value to the values stored in the data table. The method also includes providing an output indicating the breached interlock.

DESCRIPTION OF THE DRAWINGS

A more complete understanding of the subject matter may be derived by referring to the detailed description and claims when considered in conjunction with the following figures, wherein like numerals denote like elements.

DETAILED DESCRIPTION

Figure 1:
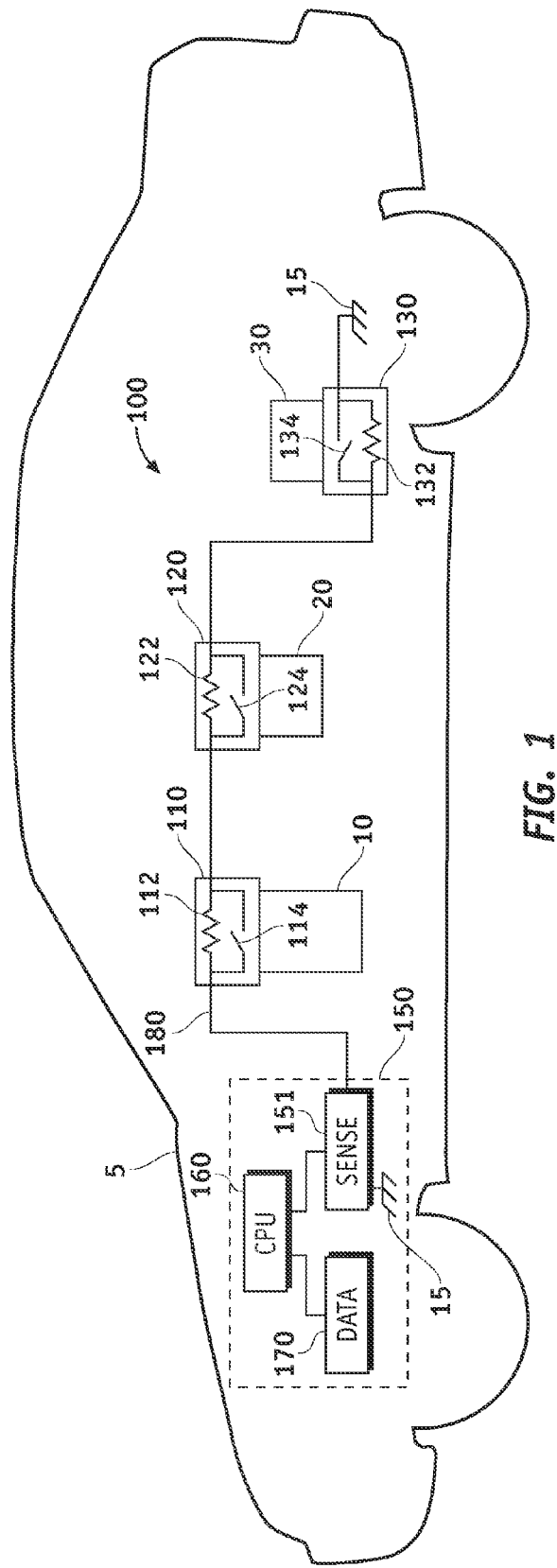
FIG. 1 is a side view of an exemplary vehicle with an exemplary series interlock loop system.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

In an exemplary embodiment, a vehicle is equipped with a series interlock system with multiple interlocks and a control module. Each of the multiple interlocks in the exemplary embodiment has a switch and a resistor in parallel with the switch. When an individual interlock is closed, indicating a safe condition, current flows through the switch, the parallel resistor is bypassed, and the individual interlock has a low or zero resistance value. When the individual interlock is open or breached, current flows through a resistor that has a known resistance value. With multiple interlocks in a series interlock loop, each individual interlock may have a different resistor value. In this way when only one of the interlocks is breached, the entire interlock loop has a resistive value substantially equal to the resistance of the one breached interlock. A data table may be set up with values corresponding to the known resistance values of the individual interlocks to identify the particular interlock that has been breached.

In the exemplary embodiment, the control module includes a sensor, such as an analog to digital converter, to measure a voltage corresponding to the resistance or other electrical characteristic of the series interlock loop. The control module compares the measured voltage to the values of the data table to determine which of the interlocks are breached. In this manner a series interlock system implemented according to the exemplary embodiment can determine which of several interlocks is breached, thereby saving time and effort in analyzing interlock breaches. Details of several exemplary embodiments will now be presented with particular reference to the drawing figures.

FIG. 1 shows a vehicle 5 with an exemplary series interlock system 100. Series interlock system 100 according to the exemplary embodiment of FIG. 1 includes a control module 150 electrically coupled to a series interlock loop 180. Control module 150 may include sensing module 151 coupled to a processor 160 and a data table 170. Series interlock loop 180 may include any number of interlocks, such as first safety interlock 110, second safety interlock 120, and third safety interlock 130 shown in FIG. 1. In the exemplary vehicle, the interlocks are located at different locations, with first safety interlock 110 at a first location 10, for example at an access point for a motor. Second safety interlock 120 is at a second location 20, for example at an access point for a battery. Third safety interlock is at a third location 30, for example at an access point for a transmission. Other embodiments may provide any number of interlocks located anywhere on vehicle 5, and arranged in any manner.

Each of the safety interlocks (110, 120, and 130) in the exemplary embodiment has an open position and a closed position. When one of the safety interlocks is in the closed position, the interlock acts as a short in the series interlock loop, with a very low impedance value. When the interlock is in an open position, however, the interlock can still exhibit a known impedance value and can continue to pass current through exemplary series interlock loop 180. In the exemplary embodiment, current flows through different paths in series interlock loop 180 depending on the open or closed positions of the safety interlocks (110, 120, and 130). As the current flows through different paths, series interlock loop 180 can have different overall electrical characteristics, for example, different impedance values. The different impedance values may be measured by control module 150.

Control module 150 is any system designed to measure an electrical characteristic related to an interlock. Control module 150 may also effectuate a change in a system based on the measured electrical characteristic. Control module 150 may include any number of different components, devices, and/or modules, and may be implemented using hardware and/or software. Control module 150, for example, may include sensing module 151, processor 160, and data table 170.

Sensing module 151 is any device, circuit or component that is designed to sense or detect an electrical characteristic. Sensing module 151 may be designed to sense a resistive, capacitive, inductive, magnetic or other electrical characteristic of a circuit coupled to sensing module 151. In the exemplary embodiment of FIG. 1, sensing module 151 is configured to measure an overall resistive value of series interlock loop 180. Sensing module 151 may also be configured to transmit a value to processor 160. In an exemplary embodiment, sensing module 151 is an analog-to-digital conversion feature, which may be implemented with features in control module 150.

Processor 160 is any circuit or combination of circuits that executes logic based on an input value, and produces a result as an output. Processor 160 may be any processor or combination of processors such as analog processors or analog computers, digital processors, microprocessors, and/or microcontrollers. In the exemplary embodiment of FIG. 1, processor 160 is a microcontroller. In other embodiments processor 160 is a microprocessor that is separate from control module 150. Processor 160 may be communicatively coupled to data table 170.

Data table 170 is any collection of stored values related to interlock system 100. Data table 170 may be stored in any manner such as on a computer readable medium in a digital format. Data table may be stored in a computer memory such as random access memory, flash memory, read-only memory, drum memory, magnetic core memory, bubble memory, twistor memory, and/or other types of magnetic or non-magnetic storage. Data table 170 may be a collection of digital or analog values, for example, values related to different impedance values of series interlock loop 180. In the exemplary embodiment of FIG. 1, data table 170 is part of control module 150. In other embodiments data table 170 is separate from control module 150 and may be communicatively coupled to processor 160.

In FIG. 1, with each of the safety interlocks (110, 120, and 130) in the exemplary embodiment passing current in both the open and closed states, control module 150 is able to measure an overall electrical characteristic of series interlock loop 180 that changes when different combinations of interlocks are open and/or closed. Control module 150, for example, may measure the overall electrical characteristic of the series interlock loop 180 and may communicate the overall electrical characteristic as a numerical value to processor 160. Processor 160 suitably compares the received numerical value with values in data table 170 or the like. The values in data table 170 may represent the possible voltages that can result from the various impedances of the open or closed interlocks. By comparing the sensed voltage to these known values, the exemplary system determines which combination of open and/or closed interlocks is currently present in series interlock loop 180.

The exemplary embodiment of FIG. 1 is shown with each interlock having a resistor in parallel to a switch. Other circuit arrangements may be used in accordance with other embodiments so that each interlock has a first impedance value when closed and a second impedance value when open or breached. The impedance device in the exemplary embodiment of FIG. 1 is shown as a resistor. Other devices with measurable impedances such as capacitors and/or inductors may be used in other embodiments.

Figure 2:
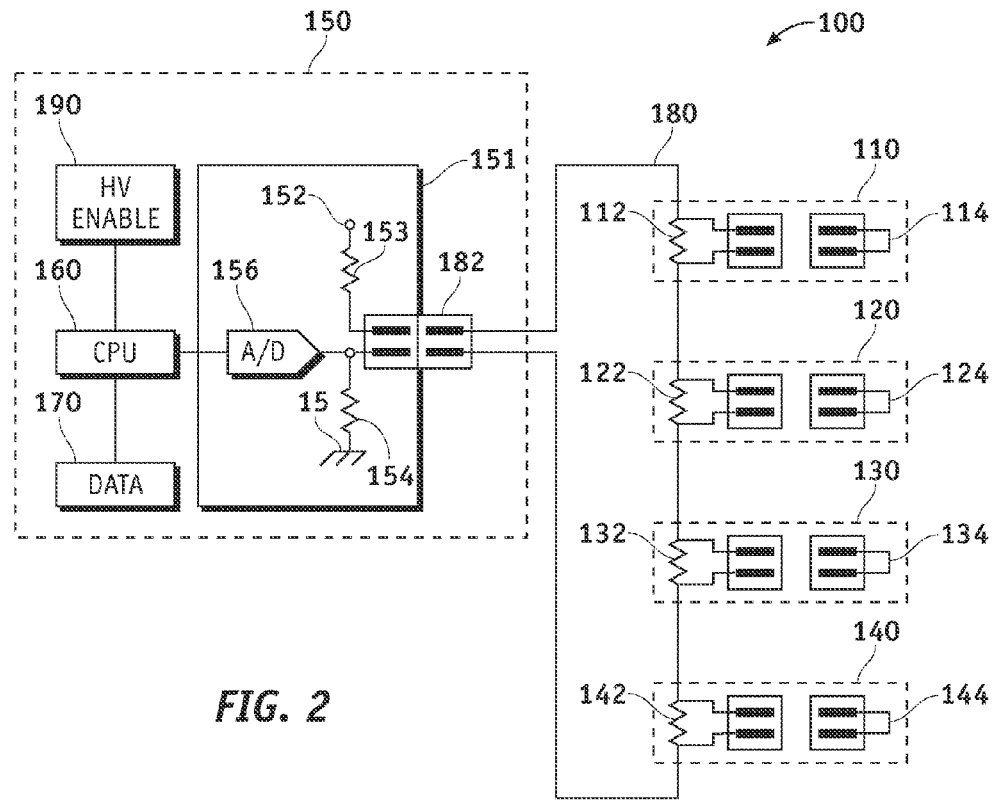
FIG. 2 is circuit diagram of an exemplary series interlock system.

FIG. 1 is shown as an exemplary embodiment with three safety interlocks (110, 120, and 130) connected in series as part of series interlock loop 180 at three locations. In other embodiments, more or fewer interlocks may be present in series interlock loop 180 at other suitable locations, other than those discussed. FIG. 2, for example, shows series interlock loop 180 with first, second, and third safety interlocks (110, 120, and 130), as well as a fourth safety interlock 140. The embodiment of FIG. 2 does not require the safety interlocks at any particular location, as they may be placed at any suitable location within a vehicle or other system.

The details and operation of the exemplary embodiment shown in FIG. 2 will now be discussed. Control module 150 may include sensing module 151 communicatively coupled to processor 160. Processor 160 in the exemplary embodiment communicates with an enable circuit 190 and data table 170. Enable circuit 190 may be any circuit for enabling or disabling a system including, for example, a high voltage system. Sensing module 151 in the exemplary embodiment has a source 152, a connection to electrical ground or other reference 15, a read resistor 154, and a sensor 156. Sensor 156 is suitably connected to measure an overall electrical characteristic of series interlock loop 180. Sensing module 151, for example, may be connected to series interlock loop 180 with an interlock loop connector 182.

Sensor 156 is any device for measuring an electrical characteristic. Sensor 156 may sense or detect the electrical characteristic in any manner. Sensor 156 may measure an electrical characteristic, for example, continuously, synchronous, asynchronous, and/or in other ways. Sensor 156 may be a device such as an analog to digital converter.

In an exemplary embodiment, sensor 156 measures a voltage change across read resistor 154. Read resistor 154 and series interlock loop 180, for example, may be arranged as a voltage divider circuit. In this manner, sensor 156 is connected to measure the voltage change across read resistor 154 as the impedance of series interlock loop 180 changes. The voltage across read resistor 154 in one exemplary embodiment decreases as the overall impedance in series interlock loop 180 increases. In the exemplary embodiment, safety interlocks (110, 120, 130, and 140) have resistors with known resistor values, allowing the voltage measured by sensor 156 to be correlated with an expected result depending on the open or closed position of the safety interlocks (110, 120, 130, and 140). Sensor 156 in the exemplary embodiment is selected to have a suitable resolution to detect the difference between impedances resulting from combinations of open and closed interlocks.

First safety interlock 110, for example, may have a first resistor 112 with a first impedance, and a first switch 114. Similarly, second safety interlock 120 in the exemplary embodiment includes a second resistor with a second impedance, and a second switch. Third safety interlock 130 may also suitably have a third resistor 132 with a third impedance, and a third switch 134. Fourth safety interlock in the exemplary embodiment includes a fourth resistor 142 with a fourth impedance, and a fourth switch 144. As discussed previously, when the exemplary interlock is closed, the impedance of the interlock may be approximately equivalent to a short or other low impedance condition. When the interlock is open in the exemplary embodiment, the impedance changes to correspond to the impedance of the resistor. When one or more of the interlocks become breached, the resistance of series interlock loop 180 therefore changes. The overall resistance of the exemplary circuit that includes read resistor 154 also changes, so a change in voltage will be read by sensor 156 across read resistor 154. Other embodiments may be modified as desired, for example by reversing the flow of current by exchanging the position of source 152 and ground 15, and/or by reading the voltage potential across series interlock loop 180 rather than read resistor 154.

A switch is any device that changes states of electrical coupling. In the example embodiment shown in FIG. 2, switches 114, 124, 134, and 144 may be jumper-type switches that connect to create shorts across resistors 112, 122, 132, and 142, respectively. The switches of this exemplary embodiment have two states, open and closed. In other embodiments, interlock switches may be other types of switches, such as single pole single throw switches 114, 124, and 134 shown in FIG. 1. In an alternative embodiment, switches 114, 124, 134, and 144 may operate to have more than two states. Switches, 114, 124, 134, and 144, for example, may be magnetic switches, micro switches, solid state switches, relays, and/or other types of switches.

Interlocks in series interlock loop 180 are produced in any manner. For example, interlocks may be produced with a different value resistor in each interlock. Alternatively, one interlock may be produced with multiple resistors, and may have switches or jumpers to select the combination of resistors that are suitable in a specific interlock at a specific location. The interlocks shown in the exemplary figures are in numerical order, and have resistors in ascending order for the purposes of discussion. The interlocks, however, may be placed in any order in series interlock loop 180.

In an exemplary embodiment, series interlock loop 180 may be designed to ease identification of an opened interlock. Resistor values in the safety interlocks (110, 120, 130, and 140), may be chosen, for example, with each resistor having a different value, with the particular values selected such that every state of series interlock loop 180 produces a unique impedance value. The resistor values, for example, may be related in a geometric progression such as a doubling progression or the like. In the exemplary embodiment of FIG. 2, resistor values are chosen for resistors (112, 122, 132, and 142) in the safety interlocks (110, 120, 130, and 140) in a geometric progression. Specifically, the values are chosen in this exemplary embodiment in a doubling progression with second resistor 122 having a value twice as great as first resistor 112, and third resistor 132 having a value twice as great as second resistor 122, as well as fourth resistor 142 having a value twice as great as third resistor 132. By choosing values in the exemplary geometric progression, all combinations of resistances are unique in the various combinations of open and closed positions in series interlock loop 180. In one embodiment, for example, first resistor 112 is a 10Ω resistor, second resistor 122 is a 20Ω resistor, third resistor 132 is a 40Ω resistor, and fourth resistor 142 is an 80Ω resistor. Other embodiments may have widely varying values from the example, however.

As discussed above, series interlock loop 180 may have more or fewer safety interlocks. The doubling progression may be continued in this example, with additional successive interlocks having a resistor with a value that is double the value of the prior resistor. Other nominal resistor values and sequences of values may be selected in other embodiments. Factors for choosing nominal impedance values may also include the maximum deviation of the component value from the nominal value, the operating temperature range, and other specific circuit or environmental factors.

In another exemplary embodiment, first resistor 112, second resistor 122, third resistor 132, and fourth resistor 142 may all be implemented with a resistor of the same nominal value. Although implementing resistors with the same value does not typically allow one embodiment of the system to detect which of the safety interlocks are breached, the known values coupled in series would allow the determination of the number of breached interlocks, thereby providing an improvement over conventional series interlock systems.

In another exemplary embodiment, resistor values may be chosen with different values in a different geometric progression for each safety interlock. A geometric progression may have values such that each of the interlocks have a unique resistor value so that when only one interlock is breached, control module 150 can determine which interlock is breached. Series interlock loop 180 in this exemplary embodiment may not have a unique overall electrical characteristic for each unique combination of open and closed interlocks. As an example, a series interlock loop 180 may have five interlocks with five resistors with nominal values of 1Ω, 2Ω, 3Ω, 4Ω and 5Ω. The number of possible combinations of open and closed interlocks in this scenario is $2^5$ or 32 possible combinations. With the exemplary resistors, the interlock loop may have the same overall electrical characteristic in the series interlock loop 180 for different combinations of open and closed interlocks. As an example, in a first situation, interlocks 1 and 2 are open and the series interlock loop has an overall electrical characteristic of 3Ω. In a second situation only interlock 3 is open, and again the series interlock loop has an overall electrical characteristic of 3Ω. Although this exemplary system may not detect the exact combination of open and closed interlocks in all 32 unique situations, the system may nevertheless be able to determine that a small set of possibilities exist for interlock breach locations, thereby providing an improvement over conventional series interlock systems.

Sensor 156, as discussed, measures different values due to changes in series interlock loop 180. Sensor 156 may also be able to detect an open condition in series interlock loop 180. Open circuits may result, for example, when interlock loop connector 182 becomes disconnected from sensing module 151. Sensor 156 could detect an open circuit as an additional condition to other conditions already discussed, and could communicate the open circuit condition as a numerical value to processor 160. With sensor 156 measuring voltage across read resistor 154 in the exemplary embodiment, an open circuit in series interlock loop 180 could be measured as zero volts across read resistor 154, although other values could be formulated in other embodiments.

In one embodiment a source component 153 is coupled between source 152 and series interlock loop 180. Source component 153 may provide a means to detect a short circuit condition from sensor 156 to source 152. Sensor 156 in the exemplary embodiment would only measure the voltage of source 152 if a short circuit to source 152 existed, and would otherwise read the voltage of source minus the voltage drop across source component 153 when all interlocks are closed. In the exemplary embodiment of FIG. 2 source component is a resistor that provides a voltage drop across the resistor. In another embodiment source component 153 is a diode with a constant voltage drop across the diode. In other embodiments sensor 156 may detect other conditions.

Figure 3:
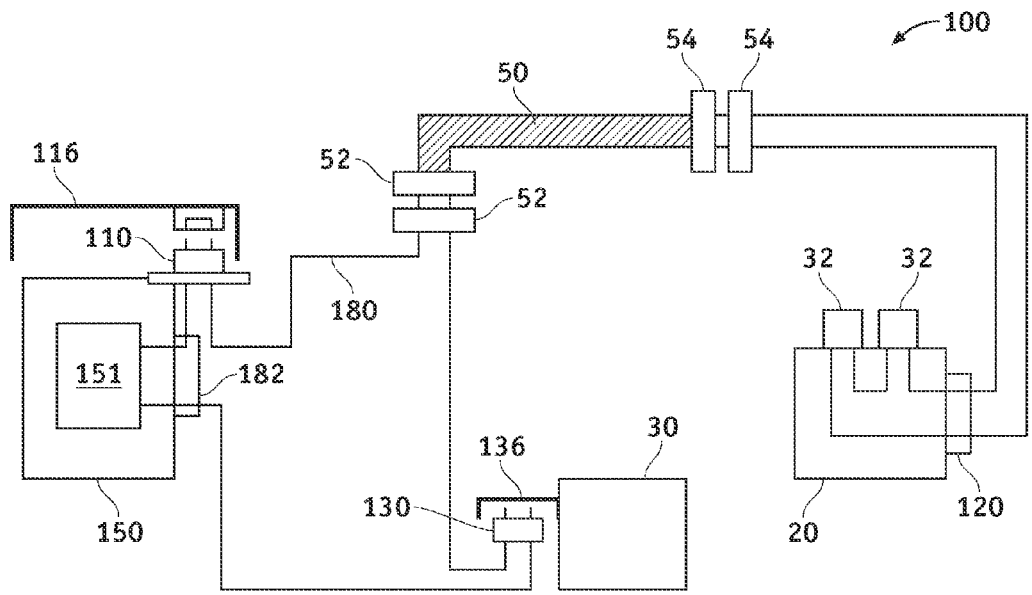
FIG. 3 is a block diagram of an exemplary series interlock system.

In other exemplary embodiments, connectors are used in series interlock loop 180. In FIG. 3, for example, an exemplary embodiment is shown with a wiring harness 50 with a first harness connector 52 and a second harness connector 54. If either of first or second harness connectors 52, 54 are disconnected in the exemplary embodiment, series interlock loop 180 will not pass current and will be an open circuit. In the exemplary embodiment of FIG. 3, control module 150 includes an enable device to enable/disable a system such as a high voltage system. In one exemplary embodiment a contactor (not shown) may be connected to battery 20 and communicatively coupled to enable circuit 190 in control module 150. If control module 150 determines that a shutdown condition exists, enable circuit 190 may direct the contactor to disconnect battery 20 from a high voltage circuit so that battery 20 no longer supplies voltage to the high voltage circuit. Other devices operated as directed from enable circuit 190 or from another enable system may be used in other locations. In other embodiments, enable circuit 190 may be separate from control module 150.

FIG. 3 shows an exemplary interlock system 100. First safety interlock 110 is connected in the exemplary embodiment at control module 150. First safety interlock 110 may have a first access cover 116 preventing access to connectors for control module 150. Other safety features in the exemplary embodiment may include a third safety cover 136 at third location 30, and battery terminal covers 32 that are connected to second safety interlock 120. In some vehicles (such as electric vehicles including hybrid-electric vehicles), a battery or a bank of batteries can provide a power supply to one or more vehicle motors. While the batteries are charging, a high voltage and/or high current may be present at the battery terminals. Battery terminal covers 32 may therefore be connected to second safety interlock 120 to prevent access to the terminal while the batteries are charging.

In one embodiment of safety interlock system 100, an interlock breach at one location is treated differently than a breach at a different location. The exemplary series interlock system 100 includes logic that determines a response to an interlock breach based on the location of the breach as well as present operating conditions. When series interlock loop 180 is implemented in vehicle 5, for example, various levels of priority may exist for disabling a system in vehicle 5 depending on the present operating conditions of vehicle 5 and the location of the safety interlock breach. Operating conditions of vehicle 5 may include a present speed of the vehicle, a charge status of the battery, a present operating gear, whether the headlights are in use, conditions of the road, location of the vehicle, proximity of the vehicle to specific locations, and/or other operating conditions as appropriate. Processor 160 may receive data from various sensors indicating various operating conditions of vehicle 5 such as a numerical value from sensor 156 related to the state of series interlock loop 180, and numerical values from other devices related to other present operating conditions. In the exemplary embodiment, processor 160 then compares each of the numerical values to data table 170. Processor 160 may have logic suitably programmed to determine a response to an interlock breach at a specific location under determined operating conditions.

Interlock system 100 may include logic that uses data table 170 to determine a response to an interlock breach. In one exemplary embodiment, an operating condition of vehicle 5 includes whether vehicle 5 is presently moving. In one example, a processor may determine that a vehicle 5 is moving based on a determined operating condition, and that an interlock is breached that is not accessible from inside vehicle 5. The interlock system 100 in this example may have logic to determine that the proper response is to alert the driver to proceed to a repair facility rather than shutting down a motor or other portion of vehicle 5. In an alternative embodiment, programmed logic determines that a proper response to the above situation may be to control vehicle 5 to achieve a controlled stop before disabling one or more systems.

Figure 4:
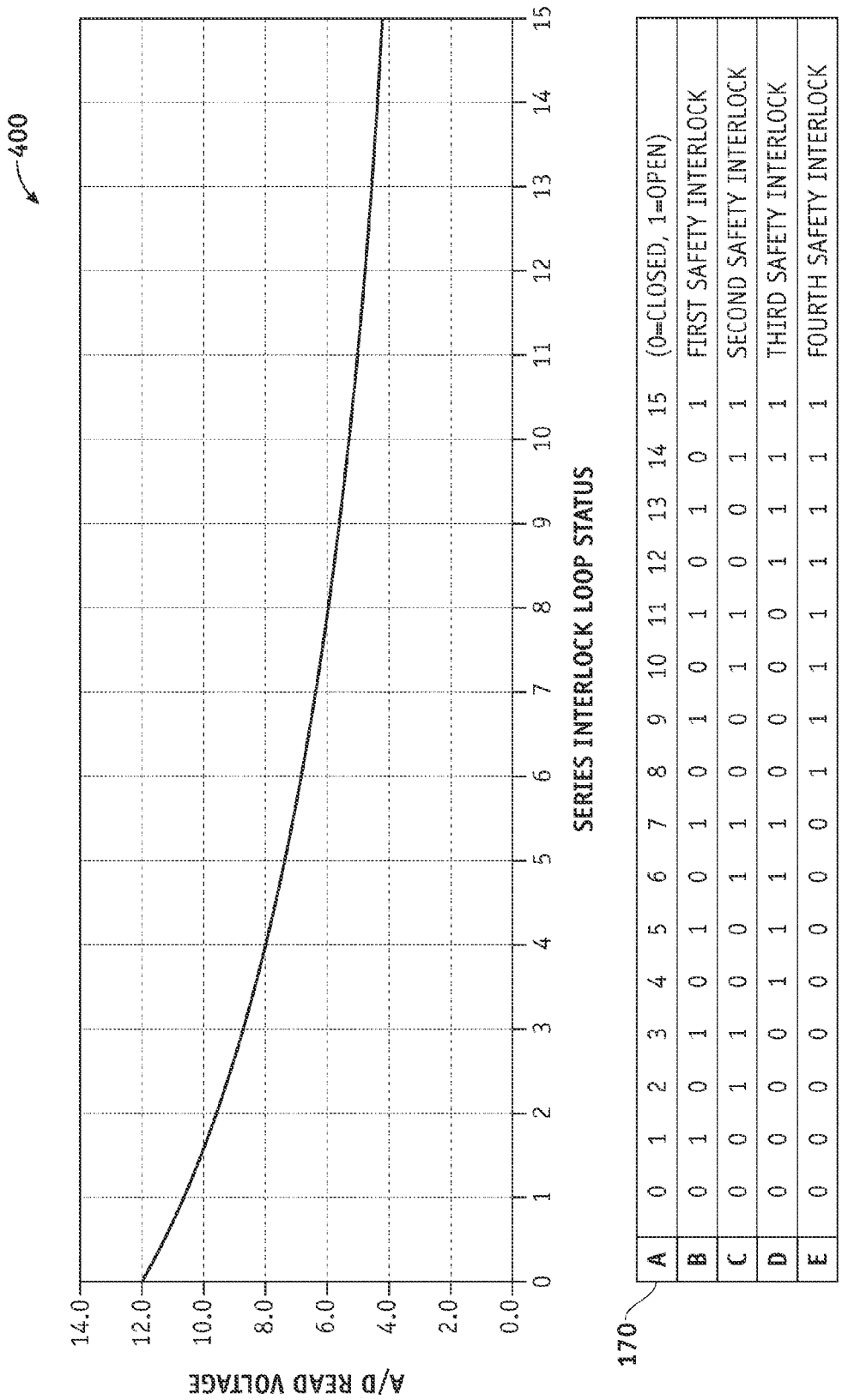
FIG. 4 is a data table used in an exemplary interlock system and an exemplary graph representing relationships in the data table.

More details will now be discussed related to data table 170 in an exemplary embodiment show in FIG. 4. As discussed above, data table 170 may be any collection of stored values related to interlock system 100. Data table 170 shown in FIG. 4 is an exemplary embodiment of a data table that may be used in interlock system 100 having four interlocks in series interlock loop 180. The values and structure of exemplary data table 170 are correlated to the exemplary embodiment of interlock system 100 shown in FIG. 2. In other embodiments, data table 170 may have structure correlated with other embodiments of interlock system 100. Exemplary data table 170 in FIG. 4 has five rows labeled A-E for the purpose of discussion. Row A is a reference row with the numbers 0-15 representing the sixteen possible states of the exemplary series interlock loop with four safety interlocks. Rows B-E represent the possible states (open or closed) in the four exemplary safety interlocks. Column 0, for example, represents the state of series interlock loop 180 with all four safety interlocks closed, represented with a "0", in rows B-E under column 0. Column 15 represents the state of series interlock loop 180 with all 4 interlocks in an open position, represented with a "1", in rows B-E under column 15. As a third example, column 6 represents the state of series interlock loop 180 with first safety interlock closed represented with a "0", second safety interlock open represented with a "1", third safety interlock open represented with a "1" and fourth safety interlock closed represented with a "0".

Data table 170 in an example embodiment may include other data not shown in FIG. 4, such as the specific location of first through fourth interlocks (110, 120, 130, and 140), voltages correlated to the sixteen different possible states of the exemplary series interlock loop, numerical values correlated to digital readout values from sensor 156 in the sixteen different states of the exemplary embodiment, and/or other data related to interlock system 100.

As discussed above, the values of the resistors in series interlock loop 180 may be chosen to provide unique overall electrical characteristics for the different states of series interlock loop 180. Read resistor 154 may also be chosen with a value to enable a measurement of each unique overall electrical characteristic. In one example embodiment, read resistor 154 is used in a voltage divider circuit and the overall electrical characteristic of series interlock loop 180 is measured as a voltage across read resistor 154. The size of read resistor 154 may determine the range of voltages measured across read resistor 154, and may be selected together with sensor 156 so that each of the anticipated changes in voltage across read resistor 154 due to a change in series interlock loop 180 may be detected by sensor 156.

Data table 170 and graph 400 shown in FIG. 4 are based on an exemplary embodiment of interlock system 100 shown in FIG. 2 without source component 153 in this example. The following discussion, therefore, will refer to FIG. 2 as well as FIG. 4. In one exemplary embodiment of FIG. 2, sensor 156 measures a voltage across read resistor 154 as an 80Ω resistor with source 152 providing a voltage of twelve volts. In the exemplary embodiment, first, second, third, and fourth resistors (112, 122, 132, and 142) are selected as 10Ω, 20Ω, 40Ω, and 80Ω resistors respectively. Graph 400 of FIG. 4 shows the relationship between the voltage measured across read resistor 154 and the sixteen states of series interlock loop 180 as discussed in relation to data table 170. With the series interlock loop 180 in series with read resistor 154, for example, the voltage measured across read resistor 154 will change as the overall electrical characteristic of series interlock loop 180 changes. When all four interlocks are closed, for example, the overall electrical characteristic of exemplary series interlock loop 180 will be approximately 0Ω as an impedance value. Virtually all of the voltage from source 152 is then measured across read resistor 154 and sensor 156 may measure about twelve volts. As another example, when fourth safety interlock 140 is the only interlock open, with the other three closed, exemplary series interlock loop 180 will have an overall electrical characteristic of 80Ω, or the value of fourth resistor 142. In this example the impedance of series interlock loop 180 is approximately equal to the impedance of 80Ω read resistor 154, so half of the voltage (or six volts) would be dropped across read resistor 154, represented on graph 400 as state 8. As shown in graph 400, the sixteen states in the exemplary embodiment each have a unique measured voltage that corresponds to a unique overall electrical characteristic of series interlock loop 180. This allows processor 160 to correlate a numerical value representing the measured voltage with a specific state of series interlock loop 180, and determine which of the safety interlocks are breached.

Figure 5:
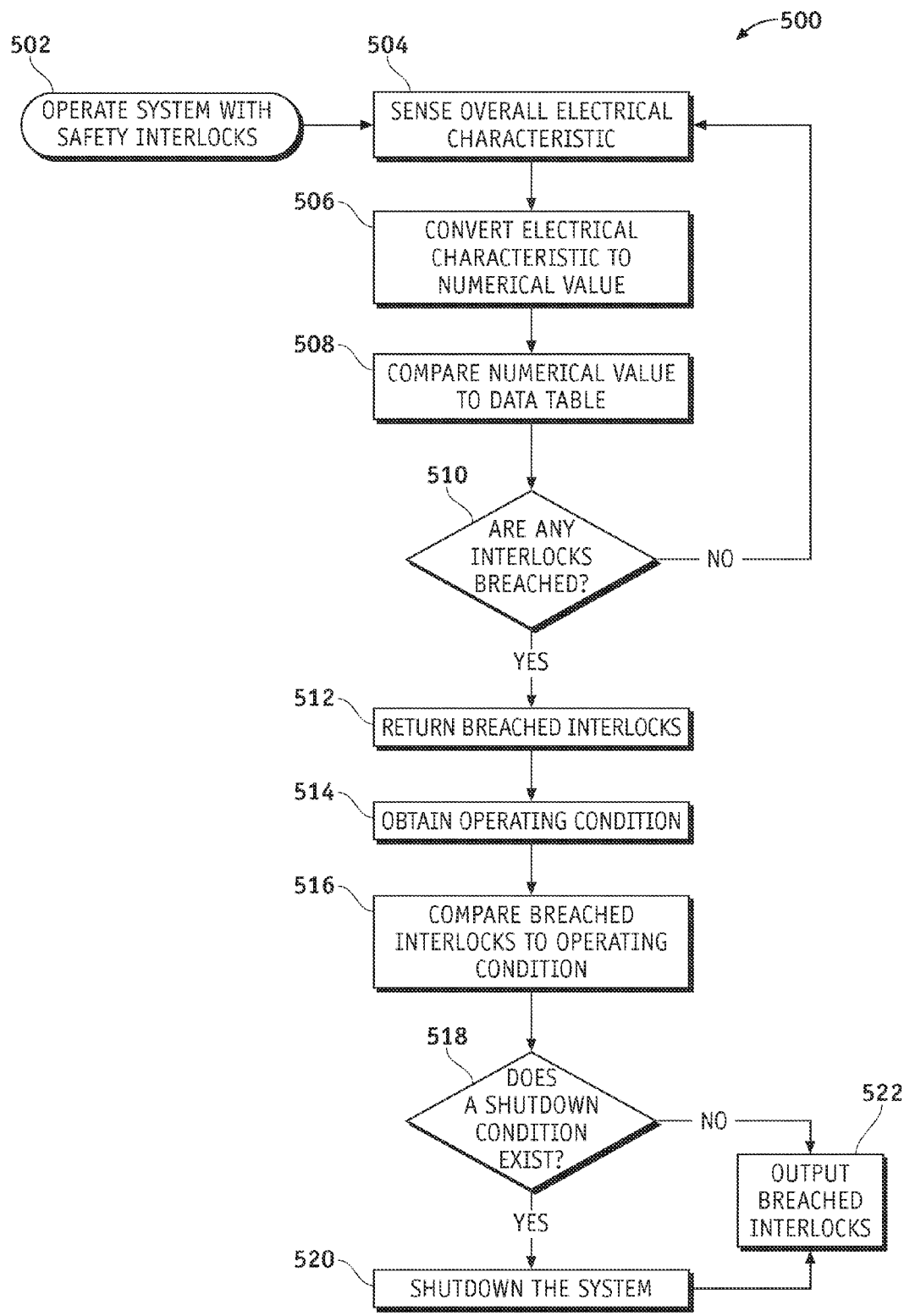
FIG. 5 is a flowchart of an exemplary method of implementing a safety interlock system.

Having generally described various embodiments and methods of implementing exemplary interlock systems 100, one general method of implementing a safety interlock system is shown in FIG. 5 and is described below. FIG. 5 is a flow chart for a method of implementing an exemplary safety interlock system 500 in a manner that allows the use of a series interlock loop, and that allows determination of breached interlocks.

Generally speaking, method 500 involves the broad steps of sensing an overall electrical characteristic of a series interlock loop (step 504), converting the electrical characteristic to a numerical value (step 506), comparing the numerical value to a data table (step 508), returning an identification of a breached interlock (step 512), obtaining an operating condition of the system (514), and comparing breached interlocks to operating condition (step 516). Some or all of these steps may be omitted, modified, or supplemented in a practical embodiment.

Method 500 may include steps useful when operating a system with safety interlocks (step 502) such as a vehicle with a high voltage interlock system. In one exemplary embodiment, the system includes series interlock loop 180 with multiple interlocks (110, 120, 130, and 140) each comprising a unique impedance value as described more fully above. The exemplary embodiment also has a data table 170 storing values corresponding to unique states of series interlock loop 180. Method 500 may apply to other systems with safety interlocks. The following discussion of method 500, however, will refer to the exemplary method introduced above.

Beginning with step 502, operating the system involves allowing power to be present in an interlock system 100. Power may be provide by activating a connection between the interlock system and a power source, for example. Operating the system may also refer to starting a system, for example, starting vehicle 5 with interlock system 100. In one exemplary embodiment, the steps of method 500 are performed prior to enabling power to the monitored system. A vehicle 5, for example, may have a high voltage power system, and an interlock system 100. The exemplary vehicle 5 determines if any interlocks are breached (step 510) prior to enabling an ignition system. If interlock system 100 determines that a safety interlock is breached in this example, the ignition system will not typically be enabled.

Step 504 begins the process of determining if there is a breach in interlock system 100. Sensing an overall electrical characteristic of a series interlock loop step 504 is performed in any manner. In an exemplary embodiment as discussed above, the overall electrical characteristic of series interlock loop 180 is sensed using the measured voltage across read resistor 154.

The measured voltage may be converted to a numerical value as shown in step 506. The numerical value may be converted in any manner. An analog to digital converter, for example, may be used to receive the analog voltage (for example as in step 504) and to convert the analog voltage measured across read resistor 154 to a digital value. The digital value may be received and stored at least temporarily by a computer, such as processor 160.

With a stored numerical value, processor 160 in the exemplary embodiment performs the step of comparing the numerical value to one or more values stored in a data table or other structure (step 508). The numerical value may be used to determine if any interlocks are breached (step 510). As discussed above in an exemplary embodiment, series interlock loop 180 has multiple unique states with each state having a unique overall electrical characteristic. One state has a unique overall electrical characteristic associated with a condition where no interlocks are breached. By comparing the numerical value to the values stored in data table 170, the processor in the exemplary embodiment can determine which of the unique states of series interlock loop 180 currently exist, and if there are any interlocks breached. If no interlocks are breached, the processor may continue to compare newly updated numerical values as sensor 156 continues to sense the overall electrical characteristic of series interlock loop 180.

In the exemplary embodiment, if processor 160 in step 510 determines that there is at least one interlock breached, one or more values are returned from data table 170 representing the breached interlocks (step 512). In the exemplary embodiment, the processor may further obtain an operating condition of the system (step 514). An operating condition of the system may be any operating condition that is relevant to a determination of whether to shut down or otherwise change the state of the system. For example, as discussed above, an operating condition may be the present velocity (speed) of vehicle 5. Multiple operating conditions may be obtained in the exemplary embodiment and stored by processor 160.

With a breached interlock and an operating condition stored, processor 160 can compare the breached interlocks to the operating condition. In one exemplary embodiment, the processor has programmed logic to determine when a shutdown or other remedial condition exists. The exemplary programmed logic determines if a remedial condition exists (step 518), based on the breached interlocks, and the operating condition.

If processor 160 in the exemplary embodiment determines that a shutdown condition does exist and that there are one or more breached interlocks, the processor communicates with enable circuit 190 to shut down the system (step 520). If processor 160 determines that there is not a shut down condition, but that one or more interlocks have been breached, processor 160 may output values corresponding to breached interlocks (step 522) or provide any other notification. In one exemplary embodiment, processor 160 communicates with a high voltage electrical enable/disable circuit based on programmed logic, breached interlocks, and present operating conditions. In other embodiments more or fewer conditions may exist to determine if a system will be shut down. In addition to remedial actions such as shutting down a system, the output may be, for example, a display visible to a driver of vehicle 5. In other embodiments, output may be a signal available to a service technician with the use of additional equipment.

In an exemplary embodiment of method 500, processor 160 continues to determine if additional interlocks are breached after determining that one of the interlocks is breached in step 510. Processor 160 may also continue to determine if a shutdown condition exists after an initial determination that a shutdown condition does not exist in step 518.

Method 500 may be performed in a computer such as an engine control module, a vehicle controller, and/or other computers. Programmed logic may be represented by source and/or object code, and may be in any programming language or machine language. The logic may be stored in any computer readable medium such as hard drives, firmware, flash memory, compact disk, RAM, and/or other types of magnetic and/or non-magnetic computer readable medium. The logic may be executed by any processor such as an analog computer processor, digital computer processor, microprocessor, virtual processor, microcontroller and/or other types of processors. The output from step 522 may be visible on a display, for example as text and/or an image. The output may be stored for future viewing or further processing.

The foregoing description refers to elements or nodes or features being "connected" or "coupled" together. As used herein, unless expressly stated otherwise, "connected" means that one element/node/feature is directly joined to (or directly communicates with) another element, node or other feature in a mechanical, logical, electrical or other appropriate sense. Likewise, unless expressly stated otherwise, "coupled" means that one element/node/feature is either directly or indirectly joined to (or directly or indirectly communicates with) another element/node/feature in a mechanical, logical, electrical or other appropriate sense. The term "exemplary" is used in the sense of "example," rather than "model." Further, although the figures may depict example arrangements of elements, additional intervening elements, devices, features, or components may be present in a practical embodiment.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An interlock system comprising:
 a series interlock loop having an overall electrical characteristic comprising:
  a first safety interlock comprising a first switch coupled in parallel with a first impedance value;
  a second safety interlock electrically coupled in series with the first safety interlock, the second safety interlock comprising a second switch coupled in parallel with a second impedance value; and
 a control module communicatively coupled to a data table with values, and configured to receive an indication of the overall electrical characteristic and to compare the overall electrical characteristic to the values in the data table to thereby identify an open one of the first and second safety interlocks.

2. An interlock system according to claim 1 the control module comprising a source, a resistor, and an analog to digital converter, wherein the resistor is electrically coupled in series with the series interlock loop, and wherein the analog to digital converter is electrically coupled to the series interlock loop to measure the overall electrical characteristic and to convert the overall electrical characteristic to a digital value.

3. An interlock system according to claim 1 wherein the data table correlates a first overall electrical characteristic to a first state of the series interlock loop, a second overall electrical characteristic to a second state of the series interlock loop, and a third overall electrical characteristic to a third state of the series interlock loop.

4. An interlock system according to claim 3 wherein the first state corresponds to a single open position in the series interlock loop at the first safety interlock, the second state corresponds to a single open position in the series interlock loop at the second safety interlock, and the third state corresponds to an open position of both the first safety interlock and the second safety interlock.

5. An interlock system according to claim 1 wherein the control module is configured to obtain the overall electrical characteristic and to compare the overall electrical characteristic to the values stored in the data table to thereby identify a breach in either of the first and second safety interlocks.

6. An interlock system according to claim 1 wherein the series interlock loop further comprises a third safety interlock electrically coupled in series with the first safety interlock and the second safety interlock, the third safety interlock comprising a third switch coupled in parallel with a third impedance value, wherein the first impedance value, the second impedance value, and the third impedance value have different values numerically related by a geometric progression.

7. A system to determine locations of breached interlocks in a series interlock loop comprising:
a first safety interlock at a first location in the series interlock loop comprising a first open position and a first open interlock impedance value corresponding to the first open position;
a second safety interlock at a second location in the series interlock loop electrically coupled in series with the first safety interlock, the second safety interlock comprising a second open position and a second open interlock impedance value corresponding to the second open position; and
a sensor configured to measure an overall electrical characteristic of the series interlock loop, wherein the overall electrical characteristic has a first overall impedance value corresponding to the first open interlock impedance value when only the first safety interlock is breached, and a second overall impedance value corresponding to the second open interlock impedance value when only the second safety interlock is breached, wherein the first overall impedance value is different from the second overall impedance value.

8. A system according to claim 7 further comprising a controller communicatively coupled to the sensor, the controller configured to change a condition in a device based on the overall electrical characteristic.

9. A system according to claim 7 wherein the second open interlock impedance value is greater than the first open interlock impedance value.

10. A system according to claim 7 wherein the first safety interlock further comprises a first switch coupled in series with a first resistor with a first resistive value, and wherein the first open interlock impedance value corresponds to the first resistive value.

11. A system according to claim 10 wherein the first safety interlock further comprises a first closed interlock impedance value that corresponds to a short circuit across the first resistive value when the first switch is closed.

12. A system according to claim 7 wherein the overall electrical characteristic of the series interlock loop is substantially equal to a sum of the first open interlock impedance value and the second open interlock impedance value when the series interlock loop is breached at the first location and at the second location.

13. A system according to claim 7 wherein the first open interlock impedance value is a first resistive value and wherein the second open interlock impedance value is a second resistive value twice the value of the first resistive value.

14. A system according to claim 7 further comprising a third safety interlock at a third location in the series interlock loop electrically coupled in series with the first and second safety interlocks, the third safety interlock comprising a third open position and a third open interlock impedance value corresponding to the third open position, wherein the first open interlock impedance value, the second open interlock impedance value and the third open interlock impedance value have different values numerically related by a geometric progression.

15. A method of implementing a safety interlock system, wherein the safety interlock system comprises a series interlock loop with multiple interlocks each comprising a unique impedance value, a data table storing values corresponding to unique states of the series interlock loop, and an overall electrical characteristic of the series interlock loop, the method comprising:
obtaining a numerical value representing the overall electrical characteristic of the series interlock loop;
identifying a breached interlock by comparing the numerical value to the values stored in the data table; and
providing an output indicating the breached interlock.

16. A method according to claim 15 further comprising sensing the overall electrical characteristic.

17. A method according to claim 15 further comprising detecting multiple breaches in the series interlock loop.

18. A method according to claim 15 further comprising obtaining an operating condition.

19. A method according to claim 18 further comprising identifying a shutdown condition based on the numerical value and the operating condition.

20. A method according to claim 18 wherein the operating condition includes operating conditions of a motor vehicle with a high voltage electrical system.

* * * * *